United States Patent [19]

Mutou et al.

[11] Patent Number: 4,773,271

[45] Date of Patent: Sep. 27, 1988

[54] BOURDON GAGE

[75] Inventors: Yoshiichi Mutou, Kakamigahara; Yoshinari Ogasawara, Kasugai, both of Japan

[73] Assignee: CKD Kabushiki Kaisha, Komaki, Japan

[21] Appl. No.: 3,937

[22] Filed: Jan. 16, 1987

[30] Foreign Application Priority Data

Jan. 24, 1986 [JP] Japan .................................. 61-9473
Jan. 24, 1986 [JP] Japan .................................. 61-9475

[51] Int. Cl.⁴ .............................................. G01L 7/04
[52] U.S. Cl. ......................................... 73/741; 73/756
[58] Field of Search ................. 73/741, 740, 739, 738, 73/737, 735, 736, 734, 733, 732, 431, 756

[56] References Cited

U.S. PATENT DOCUMENTS 1,328,895 1/1920 Pieper .................................. 73/741

Primary Examiner—Donald O. Woodiel
Attorney, Agent, or Firm—Robert E. Burns; Emmanuel J. Lobato

[57] ABSTRACT

According to the present invention, a Bourdon tube and a mechanism adapted to transmit a deformation occurring in the Bourdon tube to an indicator are accommodated within a casing having a window in one side so that the indicator may be visually observed from the exterior through the window, the casing being further provided in the other side with an inlet communicating with the Bourdon tube and with insertion holes for mounting screws, wherein the mounting screws are threaded through the insertion holes into corresponding threaded holes formed in a mounting surface of an associated fluid handling device, aligning the inlet formed in the casing in communication with the Bourdon tube to a gage port formed in the mounting surface of the fluid handling device.

3 Claims, 4 Drawing Sheets

BOURDON GAGE

BACKGROUND OF THE INVENTION

The conventional Bourdon gage comprises a main body, a tubular mount formed with a male tread therearound and outwardly projecting from said main body and a Bourbon tube contained within said main body and connected to said mount. To measure a secondary pressure of a pressure control valve, for example, the main body itself is rotated to engage said male thread of said mount with a female thread of a gage port which communicates with a flow channel on the secondary side and thereby to achieve installation so that fluid on the secondary side may be introduced through said mount into the Bourdon tube and thereby the secondary pressure may be measured. In such gage, the gage itself may often interfere with its environment, making a smooth rotation of the body and therefore a proper installation if a space available around the gage port is excessively limited, since said installation is, as above mentioned, achieved by rotating the body itself so as to engage the male thread of the mount with the female thread of the gage port. Certainly it will become possible to achieve the proper installation when a length of the mount is increased, but this countermeasure will inconveniently result in a substantial projection of the gage itself outwardly from the main body of the pressure control valve.

OBJECT OF THE INVENTION

A principal object of the present invention is to provide an improved Bourdon gage adapted to be installed practically without projection from outer surface of various fluid handling devices such as a pressure control valve and without requiring rotation of the gage as a whole for threading engagement.

SUMMARY OF THE INVENTION

In accordance with the present invention, a bourdon tube and a mechanism adapted to transmit a deformation occurring in the Bourbon tube to an indicator are accommodated within a casing having a window in one side so that said indicator may be visually observed from the exterior through said window, said casing being further provided in the other side with an inlet communicating with the Bourdon tube and with insertion holes for mounting screws, wherein the mounting screws are threaded through said insertion holes into corresponding threaded holes formed in a mount surface of an associated fluid handling device, aligning said inlet formed in the casing in communication with the Bourdon tube to a gage port formed in said mount surface of the fluid handling device. In this manner, it is unnecessary to rotate the casing itself for installation. Furthermore, the casing is adapted to, in accordance with the present invention, mounted closely against said mount surface of the fluid handling device so that an overall installation height may be effectively reduced and the installation thereof is possible even on a location around which an available space is considerably restricted.

DESCRIPTION OF THE PREFERRED EMBODIMENT

Figure 1:
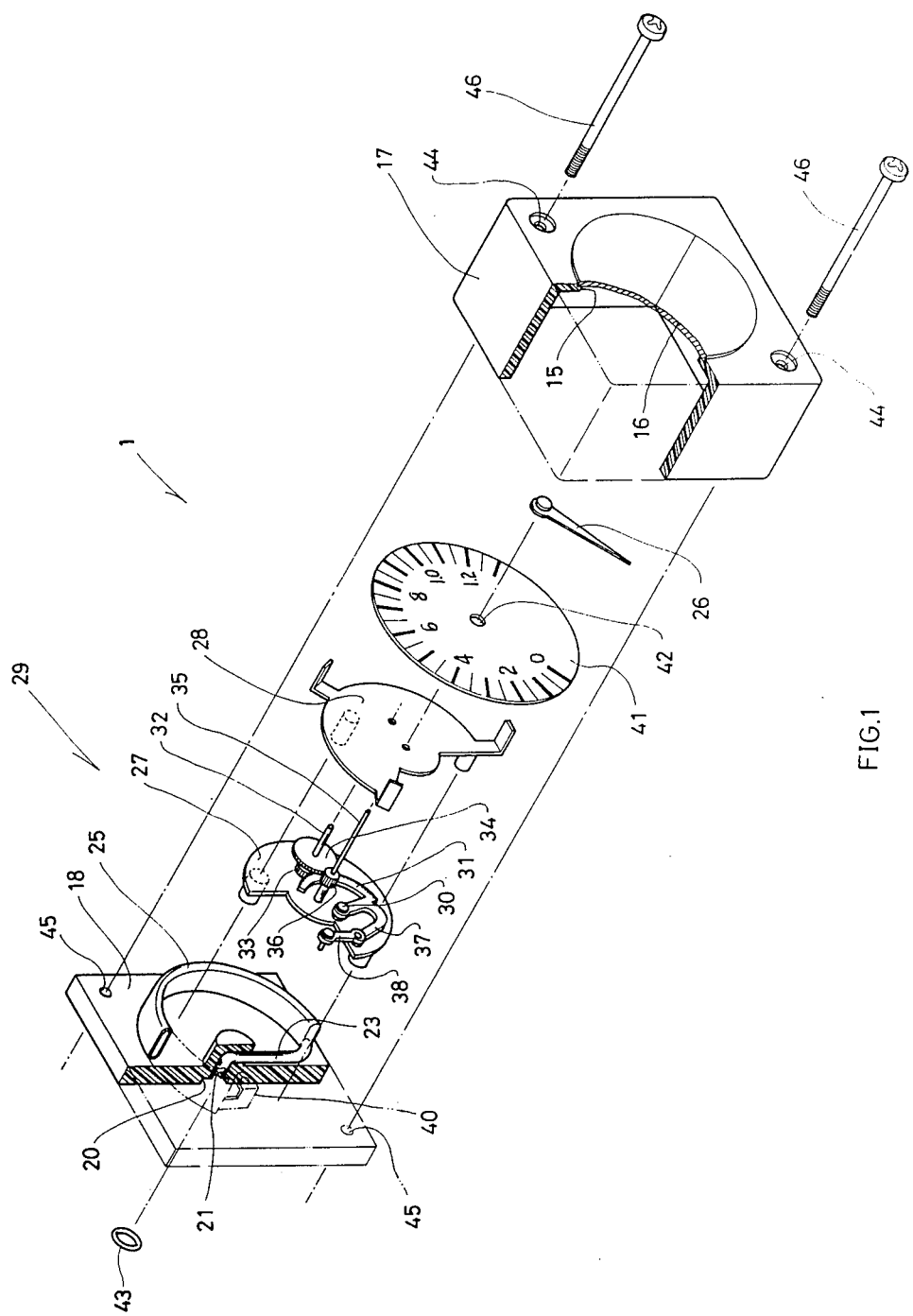
FIG. 1 is a disassembled perspective view showing, partially broken away, an embodiment of the Bourdon gage constructed in accordance with the present invention.

As shown in FIG. 1, a Bourdon gage 1 according to the present invention comprises a box-like casing 17 having a circular window 15 formed through its front side, into which a transparent disc 16 is fit, and being open at its rear side. The casing 17 contains therein a Bourdon tube 25 and a mechanism 29 adapted to trasnmit a deformation of said Bourdon tube 25 to an indicator 26. A cover plate 18 closing the rear side of the casing 17 is centrally provided in its rear surface with a circular seal groove 20 which is, in turn, centrally provided with an inlet hole 21 adapted to receive one end of a L-shaped conduit 23 so tightly as not to be removed therefrom. To the other end of said conduit 23 which vertically extends downwards, there is connected the elastic Bourdon tube 25 curved substantially in a circular configuration and closed at its free end. There is provided a base plate 27 spaced from the front surface of the cover plate 18 and this base plate 27 is provided on its front surface with a mounting plate 28. A sector gear 31 supported by a pin 30 on the base plate 27 is engaged with a pinion 33 carried on a shaft 32 extending between the base plate 27 and the mounting plate 28, and a large gear 34 integrally connected to said pinion 33 is engaged with another pinion 36 fixed on a central shaft 35 which is rotatably supported by the base plate 27 and the mounting plate 28. A front end of an arm 37 projecting from the sector gear 31 is connected by a link 38 to a free end joint 40 of the Bourdon tube 25 and the central shaft 35 extending through a central hole 42 of a dial 41 mounted on the front surface of the mounting plate 28 carries on its front end the indicator 26.

Figure 2:
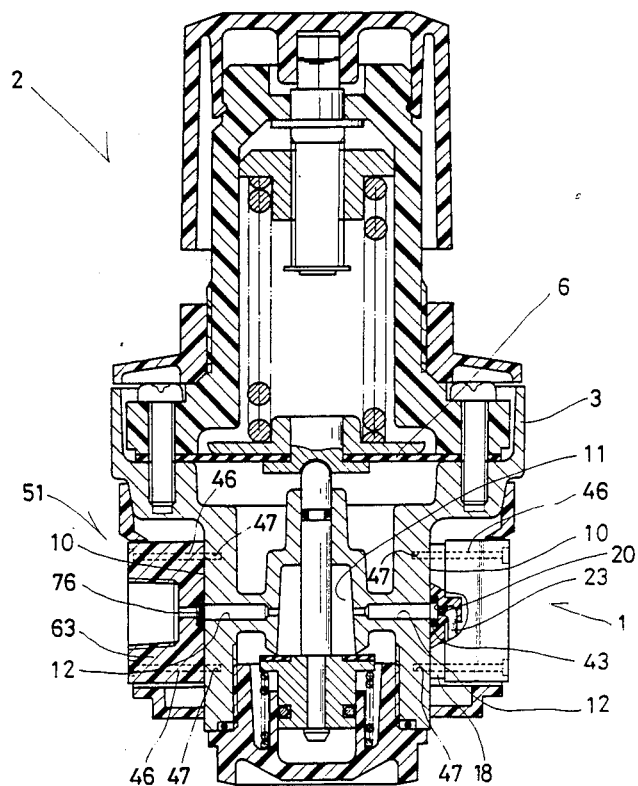
FIG. 2 is a sectional view showing a pressure control valve in corporated with the Bourdon gage.

To connect the Bourdon gage 1 constructed as above-mentioned to a pressure control valve 2, an O-ring 43 is fit into the seal groove 20 formed in the rear surface of the cover plate 18; screws 46, 46 are respectively inserted into holes 44, 44 formed through the casing 17 as well as holes 45, 45 correspondingly formed through the cover plate 18 with said Bourdon gage 1, as seen in FIG. 2, being positioned against the right hand one of retracted flat mounting surfaces 10, 10 formed on both sides of a main body 3 of the pressure control valve 2, and the screws 46, 46 are threaded into respective threaded holes 47, 47 formed therearound so that the conduit 23 connected to the Bourdon tube 25 is air-tightly connected to the port 12 under a sealing effect of the O-ring 43. A pressure within the Bourdon tube 25 communicates a secondary chamber 11 of the pressure control valve 2 through the conduit 23 and the port 12 so as to establish a pressure equilibrium therebetween. Accordingly, the bourdon tube 25 is expanded or contracted depending on the pressure within the secondary chamber 11 and a displacement of the free end thereof is transmitted by the transmission mechanism 29 to the indicator 26 so that this displacement is magnified and converted into a rotation of the indicator 26 for display of the pressure.

Figure 3:
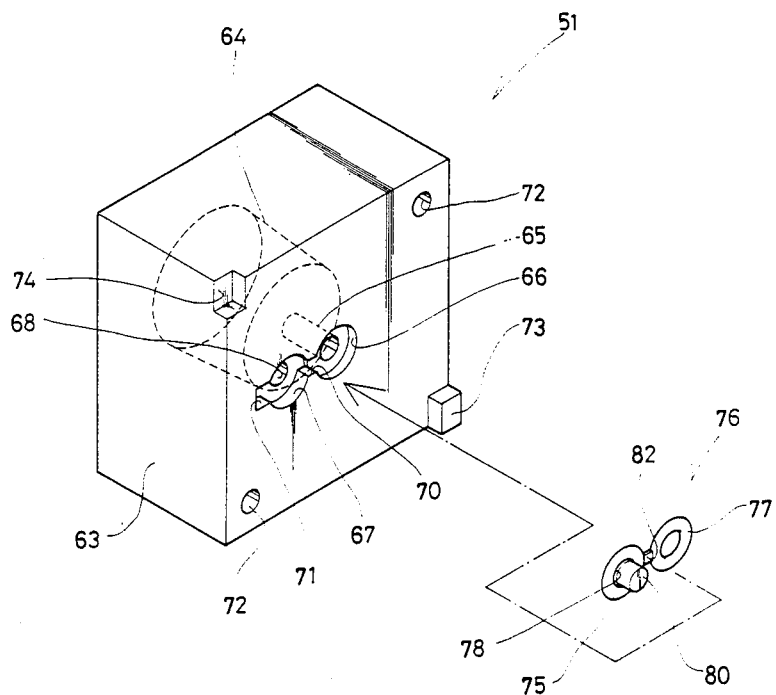
FIG. 3 is a perspective view showing stopper means for the gage port.
Figure 5:
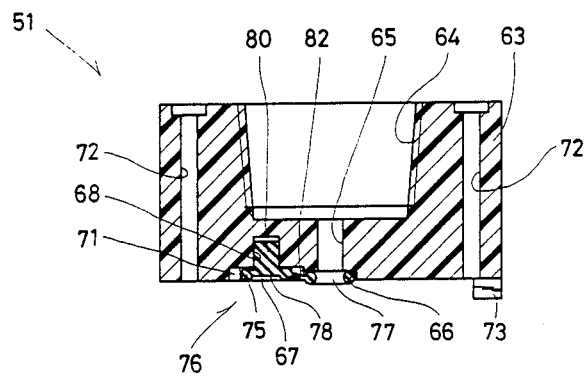
FIG. 5 is a sectional view showing a manner in which said stopper means for the gage port is utilized as a connector.
Figure 4:
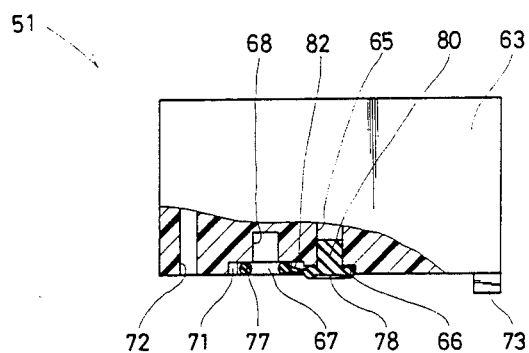
FIG. 4 is a sectional view showing said stopper means.

The port 12 formed in the left side mounting surface 10 of the main body 3 of the pressure control valve 2 is normally closed by a stopper 51 serving also as a connector as seen in FIG. 3, 4 and 5 in detail.

This stopper 51 serving also as the connector comprises a block 63 of synthetic resin shaped substantially as a rectangular parallelopipedon having a same dimension as the Bourdon gage 1 mounted on the right side mounting surface 10 of the main body 3 of the pressure control valve 2 and a seal member 76 mounted on a rear surface thereof. The block 63 is formed in an end surface with a tapered threaded hole 64 for connection and in a bottom end surface of this threaded hole 64 with a through-hole 65 open in the opposite end surface of the block 63. In said end surface of the block 63, an annular seal groove 66 is concentrically fomred around said through-hole 65 and, laterally adjacent and slightly spaced from said seal groove 66, there is provided a receiving hole 67 being idential to said seal groove 66 in diameter but deeper than the latter. The receiving hole 67 is centrally provided in its bottom surface with a blind hole 68 of a diameter substantially same as that of said through-hole 65. A communicating groove 70 diametrically communicates the seal groove 66 with the receiving hole 67 and a relief groove 71 is formed so as to extend diametrically from an edge of the receiving hole 67 that is remote from the seal groove 66. Said opposite end surface of the block 63 is formed at a pair of corners diagonally opposed to each other with insertion holes 72, 72 opening into both end surfaces and at the other pair of corners diagonally opposed to each other with a projection 73 and a recess 74, respectively. The seal groove 66 and the receiving hole 67 are adapted to receive a seal member 76 comprising an O-ring 77 and a stopper member 75 integrally connected to each other. More specifically, this seal member 76 comprises the O-ring 77 of synthetic rubber adapted to be substantially fit in the seal groove 66 and being thicker than the depth thereof and the stopper member 75 consisting of an O-ring identical to said O-ring 77, a stopper plate 78 filling the interior space of said O-ring and a projection 80 extending from one side of said stopper plate 78 so as to be substantially fit into the through-hole 65 and the bling hole 68, said O-ring 77 being integrally connected by a connecting band 82 to said stopper member 75. As seen in FIGS. 4 and 5, the connecting band 82 interconnecting the O-ring 77 and the stopper member 75 may be fit into the communicating groove 70 to fit and hold said O-ring 77 and said stopper membr 75 selectively in said seal groove 66 and said receiving hole 67, respectively, or in said receiving hole 67 and said seal groove 66, respectively. The stopper member 75 is fit into the receiving hole 67 with the projection 80 thereof being fit into the blind hole 68 as seen in FIG. 5 while the stopper member 75 is fit in the seal groove 66 with the projection 80 thereof being fit into the through-hole 65 as seen in FIG. 4. The O-ring 77 or the stopper member 75 received into the receiving hole 67 is accommodated within the rear end surface of the block 63, since the receiving hole 67 is deeper than the seal groove 66, as noted before.

The stopper 51 serving as the connector with the stopper member 75 fit in the seal groove 66 and the O-ring 77 received into the receiving hole 67 as shown by FIG. 4 is now applied onto the left side mounting surface 10 of the main body 3 of the pressure control valve 2 so that the projection 73 and the recess 74 are engaged with a projection and a recess (not shown) correspondingly formed in the mounting surface 10. Then the screws 46, 46 inserted into the both insertion holes 72, 72 are threaded into the threaded holes 47, 47 formed in the mounting surface 10 so that the through-hole 65 is aligned with the port 12 and the stopper member 75 is held between the seal groove 66 and the mounting surface 10 to shut off the opening of the port 12. When the stopper 51 serving also as the connector is mounted on the mounting surface 10 with the O-ring 77 fit in the seal groove 66 and the stopper member 75 received into the receiving hole 67, as seen in FIG. 5, the O-ring 77 is held between the seal groove 66 and the mounting surface 10 to seal the opening edges of the port 12 and the through-hole 65 while a fluid communication is established between these port 12 and through-hole 65. Accordingly, the piping end may be fixedly received into the threaded hole 64 of the block 63 to pick up a pilot pressure or like from the secondary chamber 11 of the pressure control valve 2.

We claim:

1. In combination with a fluid pressure device having a chamber, a mounting surface and a passage connecting a port in said mounting surface with said chamber, a Bourdon gage comprising a box-like casing having a window at a front side thereof and a cover plate at a rear side thereof, said cover plate having an opening, a Bourdon tube mounted in said casing and having its interior connected with sai dopening in said cover plate, pressure indicating means in said window and mechanism connecting said Bourdon tube with said indicating means, mounting screws extending through through-holes in said covr and cover plate and screwed into aligned tapped holes in said mounting surface of said fluid pressure device to mount said Bourdon gage on said device, said opening in said cover plate of said Bourdon gage being aligned with said port in said mounting surface of said fluid pressure device, and annular sealing means providing a seal between said port of said mounting surface and said opening of said cover plate of said Bourdon gage.

2. A combination according to claim 1, in which said fluid pressure device has a second mounting surface having a second port connected with said chamber, further comprising a connector-stopper member having at one side a threaded hole for connection to a fluid conduit and at the opposite side, a seating face adapted to seat on second mounting surface of said fluid pressure device with said hole in said seating surface aligned with said second port, a conduit connecting a hole in said seating surface with said threaded hole and screws extending through through-holes in said member and screwed into tapped holes in said second mounting surface of said fluid pressure device to secure said member to said device and sealing-stopper means for selectively providing a seal between said hole in said seating surface of said member and said second port and alternatively closign said second port.

3. A combination according to claim 2 in which said device has in said second mounting surface a blind hole spaced from said second port and in which said sealing-stopper means comprises an O-ring and a plug flexibly connected with one another, said sealing-stopper means being positioned with said plug in said blind hole and said O-ring in said second port to provide a seal between said second port and said hole in said seating surface and being positioned with said O-ring in said blind hole and said plug in said second port to close said second port.

* * * * *